US009835073B2

United States Patent
Weddig et al.

(10) Patent No.: US 9,835,073 B2
(45) Date of Patent: Dec. 5, 2017

(54) SECONDARY-AIR SYSTEM AND METHOD FOR CHECKING THE OPERABILITY OF THE SECONDARY-AIR SYSTEM

(71) Applicant: Volkswagen AG, Wolfsburg (DE)

(72) Inventors: Silke Weddig, Braunschweig (DE); Christian Riechert, Barleben (DE); Oliver Kirstein, Wolfsburg (DE); Ralf Starke, Wolfsburg (DE)

(73) Assignee: Volkswagen AG, Wolfsburg (DE)

( * ) Notice: Subject to any disclaimer, the term of this patent is extended or adjusted under 35 U.S.C. 154(b) by 13 days.

(21) Appl. No.: 14/989,048

(22) Filed: Jan. 6, 2016

(65) Prior Publication Data
US 2016/0194998 A1 Jul. 7, 2016

(30) Foreign Application Priority Data

Jan. 7, 2015 (DE) .......................... 10 2015 200 090

(51) Int. Cl.
*F01N 3/00* (2006.01)
*F01N 9/00* (2006.01)
(Continued)

(52) U.S. Cl.
CPC ............... *F01N 9/00* (2013.01); *F01N 3/225* (2013.01); *F01N 3/323* (2013.01); *F01N 11/00* (2013.01);
(Continued)

(58) Field of Classification Search
CPC .......... F01N 11/00; F01N 3/225; F01N 3/323; F01N 9/00; F01N 2250/14; Y02T 10/47
(Continued)

(56) References Cited

U.S. PATENT DOCUMENTS 3,921,396 A * 11/1975 Nohira .................... F01N 3/227
60/290
4,263,783 A * 4/1981 Miura ....................... F01N 3/22
60/278

(Continued)

FOREIGN PATENT DOCUMENTS

DE 19500761 A1 7/1996
DE 19723079 C1 11/1998
(Continued)

OTHER PUBLICATIONS

Search Report including Provisional Assessment of Patentability issued by the German Patent and Trademark Office or German Patent Application No. DE 10 2015 200 090.7, dated Sep. 2, 2015.

*Primary Examiner* — Mark Laurenzi
*Assistant Examiner* — Dapinder Singh
(74) *Attorney, Agent, or Firm* — Manfred Beck, P.A.

(57) ABSTRACT

A method for checking the operability of a secondary-air system of an internal combustion engine includes measuring a first pressure between a first secondary-air pump and a first master secondary-air valve as well as a second master secondary-air valve, measuring a second pressure between a second secondary-air pump and a first slave secondary-air valve and a second slave secondary-air valve, controlling the first master secondary-air valve and the first slave secondary-air valve together, and controlling the second master secondary-air valve and the second slave secondary-air valve together. A secondary-air system includes a first control and a second control, wherein a first master secondary-air valve and a first slave secondary-air valve are controllable together by the first control and wherein a second master secondary-air valve and a second slave secondary-air valve are controllable together by the second control.

11 Claims, 2 Drawing Sheets

(51) Int. Cl.
*F01N 3/22* (2006.01)
*F01N 11/00* (2006.01)
*F01N 3/32* (2006.01)

(52) U.S. Cl.
CPC ........... *F01N 2550/14* (2013.01); *Y02T 10/20* (2013.01); *Y02T 10/47* (2013.01)

(58) Field of Classification Search
USPC .......................................... 60/289, 290, 323
See application file for complete search history.

(56) References Cited

U.S. PATENT DOCUMENTS

| | | | |
|---|---|---|---|
| 4,796,606 A * | 1/1989 | Mushika | A61M 1/1086 600/18 |
| 5,444,975 A | 8/1995 | Göhre et al. | |
| 7,140,177 B2 * | 11/2006 | Koyama | F01N 3/22 60/274 |
| 7,543,444 B2 * | 6/2009 | Oi | F01N 3/32 60/285 |
| 2004/0194446 A1 | 10/2004 | Hirooka | |
| 2005/0150209 A1 | 7/2005 | Kesch et al. | |
| 2006/0218901 A1 | 10/2006 | Tsujimura et al. | |
| 2008/0016954 A1 | 1/2008 | Heinrich et al. | |
| 2009/0198435 A1 | 8/2009 | Baumann et al. | |

FOREIGN PATENT DOCUMENTS

| | | |
|---|---|---|
| DE | 4309854 C2 | 12/2002 |
| DE | 102004016418 A1 | 11/2004 |
| DE | 102004001330 A1 | 7/2005 |
| DE | 102005003591 A1 | 8/2006 |
| DE | 102006003487 A1 | 7/2007 |
| DE | 102006020596 A1 | 11/2007 |
| DE | 102006021964 A1 | 11/2007 |
| DE | 102006035077 A1 | 1/2008 |
| DE | 102008005959 A1 | 7/2009 |
| DE | 102008008532 A1 | 8/2009 |
| EP | 0663516 B1 | 5/1998 |

* cited by examiner

SECONDARY-AIR SYSTEM AND METHOD FOR CHECKING THE OPERABILITY OF THE SECONDARY-AIR SYSTEM

CROSS-REFERENCE TO RELATED APPLICATIONS

This application claims the priority, under 35 U.S.C. §119, of German Patent Application No. DE 10 2015 200 090.7, filed Jan. 7, 2015; the prior application is herewith incorporated by reference in its entirety.

BACKGROUND OF THE INVENTION

Field of the Invention

The invention relates to a secondary-air system with a plurality of exhaust gas banks, with at least one secondary-air pump, with a plurality of secondary-air lines, with a plurality of secondary-air valves, and with at least one control, wherein, through the use of the at least one secondary-air pump, secondary air is guidable, via the secondary-air lines, to the exhaust gas banks, wherein in each case a respective secondary-air valve is assigned to the secondary-air lines, wherein the secondary-air valves are controllable by the at least one control.

The invention further relates to a method for checking the operability of a secondary-air system of an internal combustion engine, wherein at least a pressure between at least one secondary-air pump and at least two secondary-air valves, namely at least one first secondary-air valve and at least one second secondary-air valve is measured, wherein the secondary-air valves are controlled by at least one control.

The pollutant emissions of an internal combustion engine can be reduced effectively by a catalytic aftertreatment through the use of exhaust gas catalytic converters in conjunction with lambda control facilities. However, an important prerequisite for this is that in addition to the lambda sensor of the lambda control facility also the exhaust gas catalytic converter has reached its light-off temperature. One possibility for a rapid heating of the exhaust gas catalytic converter is to inject secondary air into the exhaust gas tract of the internal combustion engine downstream of the exhaust valves.

Internal combustion engines may have several groups of cylinders, wherein an exhaust gas bank is assigned to each cylinder group. The exhaust gas is guided in a separated manner through several exhaust gas banks. The secondary air is in this case supplied to the separate exhaust gas banks, which requires separate secondary-air lines with separate secondary-air valves. The secondary air is supplied by a secondary-air pump and is guided into the exhaust gas behind the exhaust valves of the internal combustion engine. The exothermic reaction of the secondary air with uncombusted fuel in the hot exhaust gas and the further oxidation thereof upstream of and in the exhaust gas catalytic converter leads to an accelerated heating of the exhaust gas catalytic converter to its operating temperature and thus to a reduction of the pollutant emission during the warm-up phase of the internal combustion engine.

Legislative requirements provide for a monitoring of the secondary-air system. In particular it must be monitored whether a minimum value for the supplied secondary-air mass flow is maintained. The intention is that errors in the separate secondary-air supply feeds are recognized as such and that these errors can be attributed to the affected secondary-air supply feed and can be in particular be attributed to the defective components.

German Patent Application No. DE 10 2006 021 964 A1 discloses a generic secondary-air system and a method for checking the operability of the secondary-air system of an internal combustion engine. The internal combustion engine has two cylinder banks and correspondingly two exhaust gas banks and is embodied as a V-type engine. Detected are values of a pressure which is established in the secondary-air system between a secondary-air pump and a controllable secondary-air valve with an activated secondary-air pump and an open secondary-air valve. The secondary-air system includes a secondary-air pump, wherein, through use of the secondary-air pump, secondary-air can be guided through two secondary-air lines to the two exhaust gas banks, wherein in each case a respective secondary-air valve is assigned to the two secondary-air lines. The two secondary-air valves can be controlled separately through the use of a control device, i.e. two controls are present in the control device. A pressure sensor is disposed between the two secondary-air valves and the secondary-air pump in the secondary-air system. The checking of the operability is achieved in that one of the two secondary-air valves is controlled to close, while the other of the two secondary-air valves is controlled to open. The assessment of the operability is accomplished in this case for the section of the secondary-air system, in which the secondary-air valve is located that is controlled to open. Subsequently, the control of the two secondary-air valves can be reversed, so that the secondary-air valve, which has previously been controlled to close, is now controlled to open and the secondary-air valve, which has previously been controlled to open, is now controlled to close. This alternating control of both secondary-air valves allows a checking of the above-mentioned sections and therefore a fault localization with a pressure sensor. A control device is configured to control the process sequence of a method for checking the operability of the secondary-air system of the internal combustion engine. The control device is configured to acquire values of the pressure that arise in the secondary-air system between the secondary-air pump and the secondary-air valves, the values of the pressure being provided by the pressure sensor. A measure for the pressure is formed from the acquired values and is compared to a setpoint value. The operability of the secondary-air system is assessed in dependence of a result of the comparison.

German Patent Application No. DE 10 2006 020 596 A1 discloses a secondary-air system for an internal combustion engine and a method for checking the operability of the secondary-air system. The secondary-air system includes two lines for guiding a secondary-air flow and includes two secondary-air valves, wherein the lines open into separate exhaust gas tracts. The secondary air flows, which are passed through the valve lines, can be controlled with the secondary-air valves. In the two lines, a pressure sensor is in each case provided in front of the secondary-air valves. A secondary-air flow, which is generated by a secondary-air pump, is divided up between the two valve lines. Secondary air, which is fed by the secondary-air pump, is guided through a supply line from the secondary-air pump to a branch device. In the branch device, the secondary air is divided up between the two lines into equal parts and the corresponding secondary-air flows are in each case guided to a respective secondary-air valve. If the secondary-air valve is open, then secondary-air flows through the corresponding valve into an associated exhaust gas tract, wherein the two exhaust gas tracts are assigned to different cylinder banks.

The generic method is not yet embodied in an optimal manner. There is an individual control of the secondary-air valves. The generic secondary-air system and the corresponding method for diagnosing the operability of the secondary-air system have the disadvantage that in case of an individual control or actuation of the secondary-air valves, an increased number of components is needed.

SUMMARY OF THE INVENTION

It is accordingly an object of the invention to provide a secondary-air system and a method for checking the operability of the secondary-air system of an internal combustion engine which overcome the above-mentioned disadvantages of the heretofore-known secondary-air systems and methods for checking the operability of secondary-air systems of this general type. In particular, it is an object of the invention to further develop and configure the generic method of the corresponding secondary-air system so that a simple and accurate way of checking the operability of the secondary-air system is provided.

With the foregoing and other objects in view there is provided, in accordance with the invention, a secondary-air system, including:

a plurality of exhaust gas banks including a first master exhaust gas bank, a second master exhaust gas bank, a first slave exhaust gas bank, and a second slave exhaust gas bank;

a plurality of secondary-air pumps including a first secondary-air pump and a second secondary-air pump;

a plurality of secondary-air lines including a first secondary-air line, a second secondary-air line, a third secondary-air line, and a fourth secondary-air line, wherein, by using the secondary-air pumps, secondary air is guidable, via the secondary-air lines, to the exhaust gas banks;

a plurality of secondary-air valves including a first master secondary-air valve, a second master secondary-air valve, a first slave secondary-air valve, and a second slave secondary-air valve, wherein in each case a respective one of the secondary-air valves is assigned to a respective one of the secondary-air lines;

the first master exhaust gas bank being connected, via the first secondary-air line, to the first master secondary-air valve, the second master exhaust gas bank being connected, via the second secondary-air line, to the second master secondary-air valve, wherein, by using the first secondary-air pump, the first and the second master secondary-air valve and associated ones of the secondary-air lines can be supplied with secondary air;

the first slave exhaust gas bank being connected, via the third secondary-air line, to the first slave secondary-air valve, the second slave exhaust gas bank being connected, via the fourth secondary-air line, to the second slave secondary-air valve, wherein, by using the second secondary-air pump, the first and the second slave secondary-air valve and associated ones of the secondary-air lines can be supplied with secondary air; and a plurality of controls including a first control and a second control, wherein, by using the first control, the first master secondary-air valve and the first slave secondary-air valve are controllable together and wherein, by using the second control, the second master secondary-air valve and the second slave secondary-air valve are controllable together.

In other words, in accordance with the invention, there is provided a secondary-air system with a plurality of exhaust gas banks, with at least one secondary-air pump, with a plurality of secondary-air lines, with a plurality of secondary-air valves, and with at least one control, wherein, through the use of the at least one secondary-air pump, secondary air is guidable, via the secondary-air lines, to the exhaust gas banks, wherein in each case a respective secondary-air valve is assigned to the secondary-air lines, wherein the secondary-air valves are controllable through the use of the at least one control, wherein the secondary-air system is characterized in that a first master exhaust gas bank is connected, via a first secondary-air line, to a first master secondary-air valve and wherein a second master exhaust gas bank is connected, via a second secondary-air line, to a second master secondary-air valve, wherein, through the use of a first secondary-air pump, the two master secondary-air valves and the associated secondary-air lines can be supplied with secondary air, wherein a first slave exhaust gas bank is connected, via a third secondary-air line, to a first slave secondary-air valve, and wherein a second slave exhaust gas bank is connected, via a fourth secondary-air line, to a second slave secondary-air valve, wherein, through the use of a second secondary-air pump, the two slave secondary-air valves and the associated secondary-air lines can be supplied with secondary air, wherein, through the use of a first control, the first master secondary-air valve and the first slave secondary-air valve are controllable together, wherein, through the use of a second control, the second master secondary-air valve and the second slave secondary-air valve are controllable together.

According to another feature of the invention, the secondary-air system includes a master engine control device and a slave engine control device. The first control is connected to the master engine control device. The second control is connected to the slave engine control device. The first and the second control each have an electrically actuatable switching valve.

With the objects of the invention in view there is also provided, a method for checking an operability of a secondary-air system of an internal combustion engine, wherein the method includes the steps of:

measuring a first pressure between a first secondary-air pump and a first master secondary-air valve as well as a second master secondary-air valve;

measuring a second pressure between a second secondary-air pump and a first slave secondary-air valve and a second slave secondary-air valve;

controlling the first master secondary-air valve and the first slave secondary-air valve together; and controlling the second master secondary-air valve and the second slave secondary-air valve together.

In other words, according to the invention, there is provided a method for checking the operability of a secondary-air system of an internal combustion engine, wherein at least one pressure between at least one secondary-air pump and at least two secondary-air valves, namely at least one first secondary-air valve and at least one second secondary-air valve, is measured, wherein the secondary-air valves are controlled by at least one control, wherein the method is characterized in that a first pressure between a first secondary-air pump and a first master secondary-air valve as well as a second master secondary-air valve is measured, wherein a second pressure between a second secondary-air pump and a first slave secondary-air valve and a second slave secondary-air valve is measured, and wherein the first master secondary-air valve and the first slave secondary-air valve are controlled together and the second master secondary-air valve and the second slave secondary-air valve are controlled together.

Another mode of the invention includes activating, in a first phase, both of the secondary-air pumps and opening the first master secondary-air valve, the second master secondary-air valve, the first slave secondary-air valve as well as the second slave secondary-air valve and checking whether the thereby measured first pressure is within a tolerance range and whether the measured second pressure is within a tolerance range. In other words, in a first phase, both secondary-air pumps are activated and the first master secondary-air valve, the second master secondary-air valve, the first slave secondary-air valve as well as the second slave secondary-air valve are opened and it is checked whether the thereby measured first pressure is within a tolerance range, and whether the measured second pressure is within a tolerance range.

Another mode of the invention includes opening, in a further phase, the first master secondary-air valve and the first slave secondary-air valve and closing the second master secondary-air valve and the second slave secondary-air valve; and closing, in a further phase, the first master secondary-air valve and the first slave secondary-air valve and opening the second master secondary-air valve and the second slave secondary-air valve and checking whether the thereby measured first pressure is within a tolerance range and whether the measured second pressure is within a tolerance range. In other words, in a further phase, the first master secondary-air valve and the first slave secondary-air valve are opened and the second master secondary-air valve and the second slave secondary-air valve are closed, and, in a further phase, the first master secondary-air valve and the first slave secondary-air valve are closed and the second master secondary-air valve and the second slave secondary-air valve are opened and it is checked whether the thereby measured first pressure is within a tolerance range and whether the measured second pressure is within a tolerance range.

According to another mode of the invention, the further phase is carried out only if the first pressure measured in the first phase or the second pressure measured in the first phase is outside the tolerance range.

Another mode of the invention includes closing, in a second phase, the first master secondary-air valve, the second master secondary-air valve, the first slave secondary-air valve as well as the second slave secondary-air valve and activating both of the secondary-air pumps or keeping both of the secondary-air pumps activated and checking whether the thereby measured first pressure is within a tolerance range and whether the measured second pressure is within a tolerance range. In other words, in a second phase, the first master secondary-air valve, the second master secondary-air valve, the first slave secondary-air valve as well as the second slave secondary-air valve are closed and both secondary-air pumps are activated or, respectively, are being activated and it is checked whether the thereby measured first pressure is in a tolerance range and whether the measured second pressure is within a tolerance range.

Another mode of the invention includes turning off, in a third phase, both of the secondary-air pumps and keeping the first master secondary-air valve, the second master secondary-air valve, the first slave secondary-air valve as well as the second slave secondary-air valve closed and checking whether the thereby measured first pressure is within a tolerance range and whether the measured second pressure is within a tolerance range. In other words, in a third phase, both secondary-air pumps are turned off and the first master secondary-air valve, the second master secondary-air valve, the first slave secondary-air valve as well as the second slave secondary-air valve are kept closed and it is checked whether the thereby measured first pressure is within a tolerance range, and whether the measured second pressure is within a tolerance range.

According to another mode of the invention, the secondary-air system for the method of the invention is embodied such that a first master exhaust gas bank is connected, via a first secondary-air line, to the first master secondary-air valve, a second master exhaust gas bank is connected, via a second secondary-air line, to the second master secondary-air valve, wherein, by using the first secondary-air pump, the first and the second master secondary-air valve and associated ones of the secondary-air lines can be supplied with secondary air, and such that a first slave exhaust gas bank is connected, via a third secondary-air line, to the first slave secondary-air valve, a second slave exhaust gas bank is connected, via a fourth secondary-air line, to the second slave secondary-air valve, wherein, by using the second secondary-air pump, the first and the second slave secondary-air valve and associated ones of the secondary-air lines can be supplied with secondary air, and providing the secondary-air system such that by using a first control, the first master secondary-air valve and the first slave secondary-air valve are controllable together, and such that by using a second control, the second master secondary-air valve and the second slave secondary-air valve are controllable together.

According to another mode of the invention, the secondary-air system for the method of the invention is embodied such that the first control is connected to a master engine control device, the second control is connected to a slave engine control device and such that the first and the second control each include an electrically actuatable switching valve.

The object of the invention is achieved by a secondary-air system with the above-described features and by a method including the above-described steps. The secondary-air system and the method for checking its operability have the advantage that an internal combustion engine with four exhaust gas banks and four associated secondary-air valves, namely a first and second master secondary-air valve and a first and second slave secondary-air valve can be checked through the use of only two controls. There is a crosswise control of the secondary-air valves of the master exhaust gas banks and the slave exhaust gas banks, wherein the two first secondary-air valves, namely, the first master secondary-air valve and the first slave secondary-air valve are controllable together through the use of a first control. The second master secondary-air valve and the second slave secondary-air valve are controllable together through the use of a second control. During the checking of the operability, a first pressure is measured between a first secondary-air pump and the first master secondary-air valve as well as the second master secondary-air valve. Furthermore, a second pressure between the second secondary-air pump and the first slave secondary-air valve and the second slave secondary-air valve is measured. Two further exhaust gas banks are assigned to these two slave secondary-air valves, wherein these two exhaust gas banks and the associated secondary-air valves may now be referred to as slave exhaust gas banks and slave secondary-air valves. In each case one of the master secondary-air valves and one of the slave secondary-air valves are now controlled together, i.e. they have a common control. This makes it possible to use only a small number of components, while at the same time allowing an accurate indication of the fault location in the event of a fault. In this way, the repair time in a repair shop is reduced.

A statement can be made about which exhaust gas bank has a fault associated therewith. A statement can be generated about which component is defective in the secondary-air circuit.

In the initial state—in the so-called "phase 0"—both secondary-air pumps are inactive and all secondary-air valves are closed. The pressures that are prevailing in this case are measured and it is checked whether the two pressures are within a tolerance range.

In a first phase, the two secondary-air pumps are now activated and all secondary-air valves are opened. If the measured first pressure or the measured second pressure rises above an upper limit value, then there is a blockage downstream of the pressure sensor in the secondary-air system. If the first or the second measured pressure is below a lower limit value, then the associated first or second secondary-air pump has only a reduced pump capacity or there is a leakage in the secondary-air system or there is a blockage in front of the pressure sensor. If the first or second measured pressure thus lies outside the tolerance range, a further phase is carried out, in which respectively the first and second secondary-air valves are alternately opened and closed. If the first or second measured pressure thus is within the tolerance range, the further phase is preferably skipped.

In this subsequent phase, firstly the first master secondary-air valve and the first slave secondary-air valve are now opened. The first master secondary-air valve, and the first slave secondary-air valve are connected to the common control. The second master secondary-air valve and the second slave secondary-air valve are correspondingly connected via a second control to one another. The second control controls now in this further phase the second master secondary-air valve and the second slave secondary-air valve to close. Due to the fact that now in each case the second master and, respectively, second slave secondary-air valve is closed, the measured pressure rises in the secondary-air system. If also in this case the pressure is above an upper limit value, it can be concluded that a blockage relating to the secondary-air line of the first exhaust gas bank is present. Depending on whether this relates to the first measured pressure or the second measured pressure, it can be concluded whether this relates to the first master exhaust gas bank or the first slave exhaust gas bank or, respectively, the corresponding secondary-air lines. If the pressure is too low, it can accordingly be concluded whether there is a leakage or a blockage in this corresponding subsystem. Thereafter, the first master secondary-air valve and the first slave secondary-air valve are closed and the second master secondary-air valve and the second slave secondary-air valve are opened. Based on a comparison of the corresponding measurements of the first pressure and the second pressure it can now be determined whether the fault source exists with respect to the second master exhaust gas bank or with respect to the second slave exhaust gas bank.

In a second phase, all secondary-air valves are now closed and both secondary-air pumps are however maintained in an active state, so that the tightness of the complete system can be checked.

Thereafter the two secondary-air pumps are switched off in a third phase or, respectively, put into an inactive state and all secondary-air valves are closed. If the measured first and/or second pressure does not fall sufficiently or, respectively, if the measured first pressure or the second pressure in this third phase is above an upper threshold value, then it can be concluded that one of the two secondary-air pumps or both secondary-air pumps run permanently or that the first or second pressure sensor malfunctions. If one of the two pressures is below a lower limit value, then the correspondingly associated pressure sensor is defective.

The crosswise control allows an accurate diagnosis of each component of the secondary-air system. Only two electric switching valves are required for the control or actuation, wherein all four secondary-air valves are checked. An accurate diagnosis of the individual components is made possible. The repair time is reduced and a replacement of parts that are not defective is prevented.

The above-mentioned disadvantages are thus avoided and corresponding advantages are achieved.

There are now a variety of ways to embody and further develop the secondary-air system according to the invention and the method according to the invention in an advantageous manner. For this purpose reference is made to the appended claims. In the following, a preferred embodiment of the invention is explained in detail with reference to the drawing and the associated description. In the drawing there is shown:

Although the invention is illustrated and described herein as embodied in a secondary-air system and a method for checking the operability of the secondary-air system it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

DETAILED DESCRIPTION OF THE INVENTION

Figure 1:
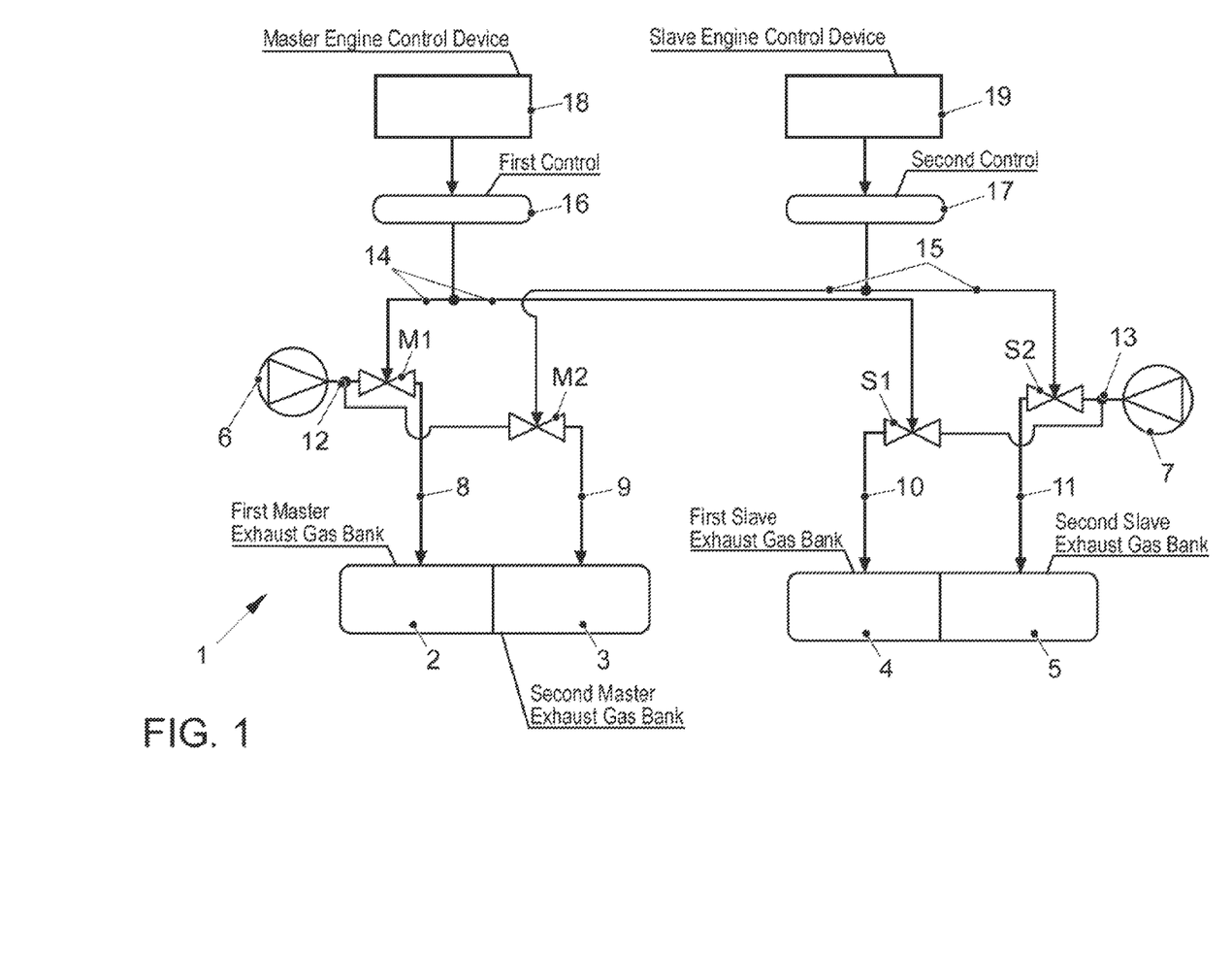
FIG. 1 is a system diagram of a secondary-air system according to the invention.

Referring now to the figures of the drawings in detail and first, particularly, to FIG. 1 thereof, there is shown a secondary-air system 1 of an internal combustion engine in a highly schematic manner. The internal combustion engine has four exhaust gas banks 2, 3, 4, 5. Each exhaust gas bank 2, 3, 4, 5 has at least one cylinder assigned thereto. Each exhaust gas bank 2, 3, 4, 5 can have in particular several cylinders, preferably four cylinders, assigned thereto. The internal combustion engine can in this case for example have a double V-type cylinder arrangement.

The two exhaust gas banks 2, 3 can be referred to as master exhaust gas banks 2, 3 and the two exhaust gas banks 4, 5 can be referred to as slave exhaust gas banks 4, 5. The exhaust gas bank 2 forms in this case a first master exhaust gas bank 2 and the exhaust gas bank 3 forms a second master exhaust gas bank 3.

Two secondary-air pumps 6, 7 are provided here. The first secondary-air pump 6 is assigned to the master exhaust gas banks 2, 3 and connected to them in a functionally effective manner via two secondary-air lines 8, 9. The second secondary-air pump 7 is assigned to the two slave exhaust gas banks 4, 5 and is connected to them in a respectively corresponding manner via two further secondary-air lines 10, 11. A secondary-air valve M1, M2, S1, and S2 is in each case disposed in the secondary-air lines 8, 9, 10, and 11. Four secondary-air valves M1, M2, S1, S2 are thus provided. The two secondary-air lines 8, 9 branch off from a junction point 12, wherein the two secondary-air valves M1 and M2 are disposed behind (i.e. downstream) of the junction point 12. The first secondary-air line 8 opens in this case into the first master exhaust gas bank 2 and the second secondary-air line 9 opens into the second master exhaust gas bank.

Figure 2:
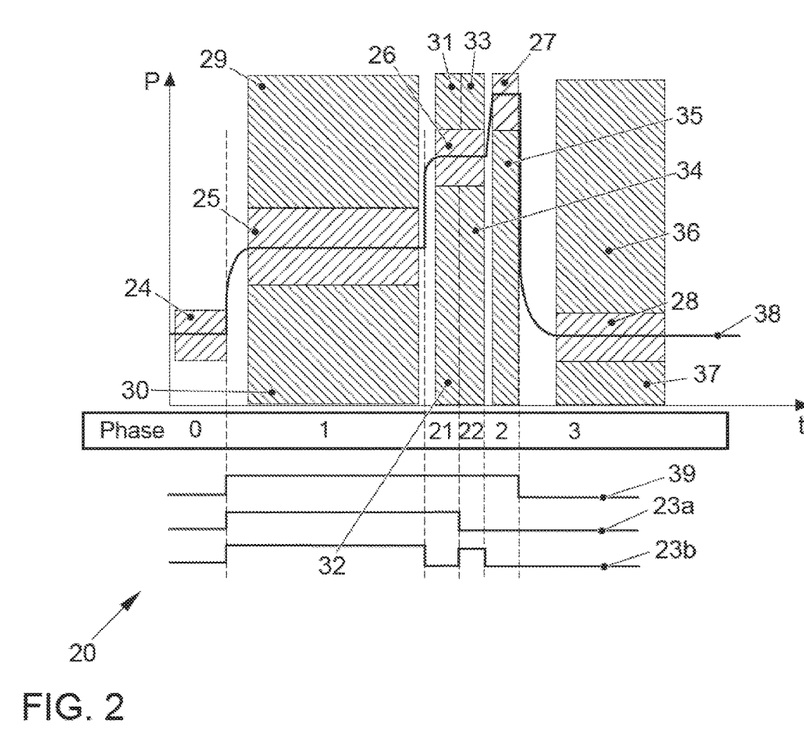
FIG. 2 is a schematic graph of a measured pressure and switching states of the associated secondary-air pump and the secondary-air valves plotted against time t in accordance with the invention.

The two secondary-air lines 10 and 11 branch off accordingly from a junction point 13, wherein the third secondary-air line 10 opens into the first slave exhaust gas bank 4 and the fourth secondary-air line 11 opens into the second slave exhaust gas bank 5. A pressure sensor, which is not shown in the drawing, is provided between the first secondary-air pump 6 and the junction point 12, wherein the pressure sensor measures a first pressure 38 (see. FIG. 2) between the first secondary-air pump 6 and the two master secondary-air valves M1, M2. A second pressure sensor (not illustrated) is provided between the second secondary-air pump 7 and the second junction point 13, wherein this second pressure sensor measures a corresponding second pressure which arises between the second secondary-air pump 7 and the two slave secondary-air valves S1, S2.

It is now particularly advantageous that the secondary-air valves M1, M2, S1, and S2 are controlled or, respectively, are controllable in a crosswise manner. The first master secondary-air valve M1 and the first slave secondary-air valve S1 are connected via a common line 14. The second master secondary-air valve M2 and the second slave secondary-air valve S2 are connected to a second control 17 via a second line 15. The controls 16, 17 are in particular embodied as electric switching valves. The electric switching valve of the control 16 is controlled by a master engine control device 18 and the electric switching valve of the control 17 is controlled by a slave engine control device 19.

In the following, reference is made to FIG. 2, wherein now the method for checking the operability of the secondary-air system 1 is explained here. In the diagram 20, first of all the measured first pressure 38 of the corresponding pressure sensor is shown. In each case, a first pressure and a second pressure are measured, but only the first pressure 38 is shown here. A switching position 39 of the secondary-air pumps 6, 7 is shown here. Further, a switching position 23a of the first secondary-air valves, namely the first master secondary-air valve M1 and the first slave secondary-air valve S1, that are controlled together, is illustrated. Further, a switching position 23b of the second secondary-air valves, namely the second master secondary-air valve M2 and the second slave secondary-air valve S2, that are controlled together, is shown. The first pressure 38 and the switching position 39, 23a, 23b are in each case plotted versus the time t The above-mentioned disadvantages are now avoided in that the first pressure 38 between the first secondary-air pump 6 and the first master secondary-air valve M1 as well as the second master secondary-air valve M2 is measured, wherein the second pressure between the second secondary-air pump 7 and the first slave secondary-air valve S1 and a second slave secondary-air valve S2 is measured, wherein the first master secondary-air valve M1 and the first slave secondary-air valve S1 are controlled together and the second master secondary-air valve M2 and the second slave secondary-air valve S2 are controlled together. Through the use of this crosswise control, the switching position of the first master secondary-air valve M1 and of the first slave secondary-air valve S1 is the same. Further, the switching position of the second master secondary-air valve M2 and the second slave secondary-air valve S2 is the same.

In a phase "0" that is to say in the initial state the first secondary-air pump 6 is inactive and all four secondary-air valves M1, S1, M2 and S2 are closed. Here, it is checked whether the first pressure 38 is within a tolerance range 24. In a subsequent first phase "1" the two secondary-air pumps 6, 7 are activated. Here, both of the first secondary-air valves M1 and S1 are opened and also the two second secondary-air valves M2 and S2 are opened. It is checked whether the first pressure 38 is within a tolerance range 25 which here corresponds to a higher pressure than the tolerance range 24 in the "phase 0." If the measured pressure 38 is above the tolerance range 25, that is, in an error range 29 then there is a blockage of the secondary-air system 1. If the measured first pressure 38 is below the tolerance range 25, then the discharge capacity of the secondary-air pump 6 or, respectively, 7 is reduced or there is a leakage in the secondary-air system 1 or a blockage in front of the corresponding pressure sensor.

This further "phase 21 and 22" is carried out only when the first pressure 38 or the second pressure in the first phase "1" is outside the tolerance range 25. If the measured pressure 38 was above the tolerance range 25, then a further "phase 21 and 22" is carried out, otherwise the process continues with the second phase "2" and the "phase 21 and 22" is skipped. In the further "phase 21 and 22" the two secondary-air pumps 6, 7 continue to be activated. Both first secondary-air valves M1 and S1 are opened and both second secondary-air valves M2 and S2 are closed. The measured pressure 38 continues to rise and it is checked whether the measured pressure 38 is within a tolerance range 26. The tolerance range 26 is situated above the tolerance range 25. If the measured pressure is now above the tolerance range 26, then it can be concluded that the blockage relates to the first master exhaust gas bank 2 or the first slave exhaust gas bank 4 or the associated components of the secondary-air system 1, because the associated secondary-air valves M1, S1 are open. Whether it concerns in this case the first master exhaust gas bank 2 or the first slave exhaust gas bank 4 can be determined by comparing the first or second pressure (not illustrated). Now (see phase "22"), the two first secondary-air valves M1 and S1 are closed and the two second secondary-air valves M2 and S2 are opened. If the measured pressure 38 is now in a fault range 33 or, respectively, in a fault range 34, it can be concluded that the corresponding leakage or blockage is attributed to the second master exhaust gas bank 3 or the second slave exhaust gas bank 5 or the associated components of the secondary-air system 1.

In the subsequent phase 2, the two secondary-air pumps 6, 7 continue to be activated, wherein now all secondary-air valves M1, S1, and M2 as well as S2 are closed. With this, the tightness of the overall secondary-air system 1 is checked. If the measured pressure 38 is within a tolerance range 27, then the tightness is in order, if the measured pressure 38 is below that, in a fault range 35, then the secondary-air system 1 has a leakage.

In the subsequent third "phase 3" the two secondary-air pumps 6, 7 are turned off, wherein all four secondary-air valves M1, S1, M2, S2 are kept closed. If in this third "phase 3" the respective pressures 38 are above a tolerance range 28, then it can be concluded that either the associated pressure sensor is faulty or the corresponding secondary-air pump 6 or, respectively, 7 runs permanently. If the measured pressure 38 is below the tolerance range 28, in the fault range 37, it can be concluded that the pressure sensor is also faulty. The tolerance range 28 corresponds essentially to the tolerance range 24, because the phases "0" and "3" are equal in terms of the state of the secondary-air pumps 6, 7 or, respectively, the secondary-air valves M1, S1, M2, S2.

LIST OF REFERENCE CHARACTERS

1 Secondary-air system
2 First master exhaust gas bank
3 Second master exhaust gas bank
4 First slave exhaust gas bank
5 Second slave exhaust gas bank
6 First secondary-air pump
7 Second secondary-air pump
8 Secondary-air line
9 Secondary-air line
10 Secondary-air line
11 Secondary-air line
12 Junction point
13 Junction point
14 Line
15 Line
16 Control
17 Control
18 Master engine control device
19 Slave engine control device
20 Diagram
23a Switching position of the two first secondary-air valves
23b Switching position of the two second secondary-air valves
24 Tolerance range
25 Tolerance range
26 Tolerance range
27 Tolerance range
28 Tolerance range
29 Fault range
30 Fault range
31 Fault range
32 Fault range
33 Fault range
34 Fault range
35 Fault range
36 Fault range
37 Fault range
38 Pressure
39 Switching position of the two secondary-air pumps
M1 First master secondary-air valve
M2 Second master secondary-air valve
S1 First slave secondary-air valve
S2 Second slave secondary-air valve

What is claimed is:

1. A secondary-air system, comprising:
a plurality of exhaust gas banks including a first master exhaust gas bank, a second master exhaust gas bank, a first slave exhaust gas bank, and a second slave exhaust gas bank;
a plurality of secondary-air pumps including a first secondary-air pump and a second secondary-air pump;
a plurality of secondary-air lines including a first secondary-air line, a second secondary-air line, a third secondary-air line, and a fourth secondary-air line, wherein, by using said secondary-air pumps, secondary air is guidable, via said secondary-air lines, to said exhaust gas banks;
a plurality of secondary-air valves including a first master secondary-air valve, a second master secondary-air valve, a first slave secondary-air valve, and a second slave secondary-air valve, wherein in each case a respective one of said secondary-air valves is assigned to a respective one of said secondary-air lines;
said first master exhaust gas bank being connected, via said first secondary-air line, to said first master secondary-air valve, said second master exhaust gas bank being connected, via said second secondary-air line, to said second master secondary-air valve, wherein, by using said first secondary-air pump, said first and said second master secondary-air valve and associated ones of said secondary-air lines can be supplied with secondary air;
said first slave exhaust gas bank being connected, via said third secondary-air line, to said first slave secondary-air valve, said second slave exhaust gas bank being connected, via said fourth secondary-air line, to said second slave secondary-air valve, wherein, by using said second secondary-air pump, said first and said second slave secondary-air valve and associated ones of said secondary-air lines can be supplied with secondary air; and
a plurality of controls including a first control and a second control, wherein, by using said first control, said first master secondary-air valve and said first slave secondary-air valve are controllable together and wherein, by using said second control, said second master secondary-air valve and said second slave secondary-air valve are controllable together.

2. The secondary-air system according to claim 1, including:
a master engine control device and a slave engine control device; said first control being connected to said master engine control device, said second control being connected to said slave engine control device; and
said first and said second control each having an electrically actuatable switching valve.

3. A method for checking an operability of a secondary-air system of an internal combustion engine, the method comprising:
measuring a first pressure between a first secondary-air pump and a first master secondary-air valve as well as a second master secondary-air valve;
measuring a second pressure between a second secondary-air pump and a first slave secondary-air valve and a second slave secondary-air valve;
controlling the first master secondary-air valve and the first slave secondary-air valve together;
controlling the second master secondary-air valve and the second slave secondary-air valve together: and
providing the secondary-air system such that a first master exhaust gas bank is connected, via a first secondary-air line, to the first master secondary-air valve, a second master exhaust gas bank is connected, via a second secondary-air line, to the second master secondary-air valve, wherein, by using the first secondary-air pump, the first and the second master secondary-air valve and associated ones of the secondary-air lines can be supplied with secondary air, and such that a first slave exhaust gas bank is connected, via a third secondary-air line, to the first slave secondary-air valve, a second slave exhaust gas bank is connected, via a fourth secondary-air line, to the second slave secondary-air valve, wherein, by using the second secondary-air pump, the first and the second slave secondary-air valve and associated ones of the secondary-air lines can be supplied with secondary air, and providing the secondary-air system such that by using a first control, the first master secondary-air valve and the first slave secondary-air valve are controllable together, and such that by using a second control, the second master secondary-air valve and the second slave secondary-air valve are controllable together.

4. The method according to claim 3, which comprises activating, in a first phase, both of the secondary-air pumps and opening the first master secondary-air valve, the second master secondary-air valve, the first slave secondary-air valve as well as the second slave secondary-air valve and checking whether the thereby measured first pressure is within a tolerance range and whether the measured second pressure is within a tolerance range.

5. The method according to claim 4, which comprises:
opening, in a further phase, the first master secondary-air valve and the first slave secondary-air valve and closing the second master secondary-air valve and the second slave secondary-air valve; and
closing, in a further phase, the first master secondary-air valve and the first slave secondary-air valve and opening the second master secondary-air valve and the second slave secondary-air valve and checking whether the thereby measured first pressure is within a tolerance range and whether the measured second pressure is within a tolerance range.

6. The method according to claim 5, which comprises carrying out the further phase only if the first pressure measured in the first phase or the second pressure measured in the first phase is outside the tolerance range.

7. The method according to claim 4, which comprises closing, in a second phase, the first master secondary-air valve, the second master secondary-air valve, the first slave secondary-air valve as well as the second slave secondary-air valve and activating both of the secondary-air pumps or keeping both of the secondary-air pumps activated and checking whether the thereby measured first pressure is within a tolerance range and whether the measured second pressure is within a tolerance range.

8. The method according to claim 5, which comprises closing, in a second phase, the first master secondary-air valve, the second master secondary-air valve, the first slave secondary-air valve as well as the second slave secondary-air valve and activating both of the secondary-air pumps or keeping both of the secondary-air pumps activated and checking whether the thereby measured first pressure is within a tolerance range and whether the measured second pressure is within a tolerance range.

9. The method according to claim 7, which comprises turning off, in a third phase, both of the secondary-air pumps and keeping the first master secondary-air valve, the second master secondary-air valve, the first slave secondary-air valve as well as the second slave secondary-air valve closed and checking whether the thereby measured first pressure is within a tolerance range and whether the measured second pressure is within a tolerance range.

10. The method according to claim 8, which comprises turning off, in a third phase, both of the secondary-air pumps and keeping the first master secondary-air valve, the second master secondary-air valve, the first slave secondary-air valve as well as the second slave secondary-air valve closed and checking whether the thereby measured first pressure is within a tolerance range and whether the measured second pressure is within a tolerance range.

11. The method according to claim 3, which comprises providing the secondary-air system such that the first control is connected to a master engine control device, the second control is connected to a slave engine control device and such that the first and the second control each include an electrically actuatable switching valve.

* * * * *